J. G. WISE.
SWITCH ROD CONNECTION.
APPLICATION FILED NOV. 20, 1908.
915,524.
Patented Mar. 16, 1909.
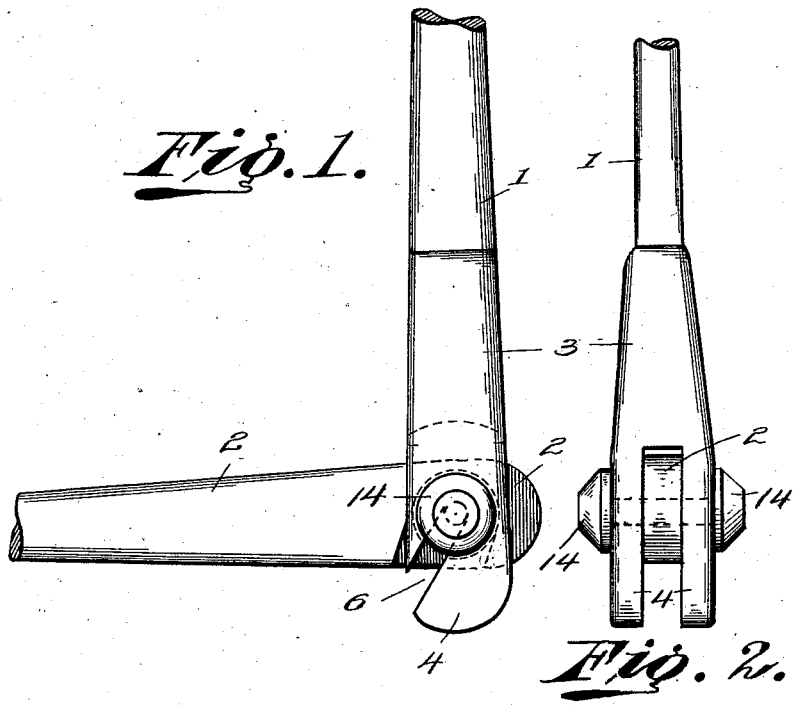
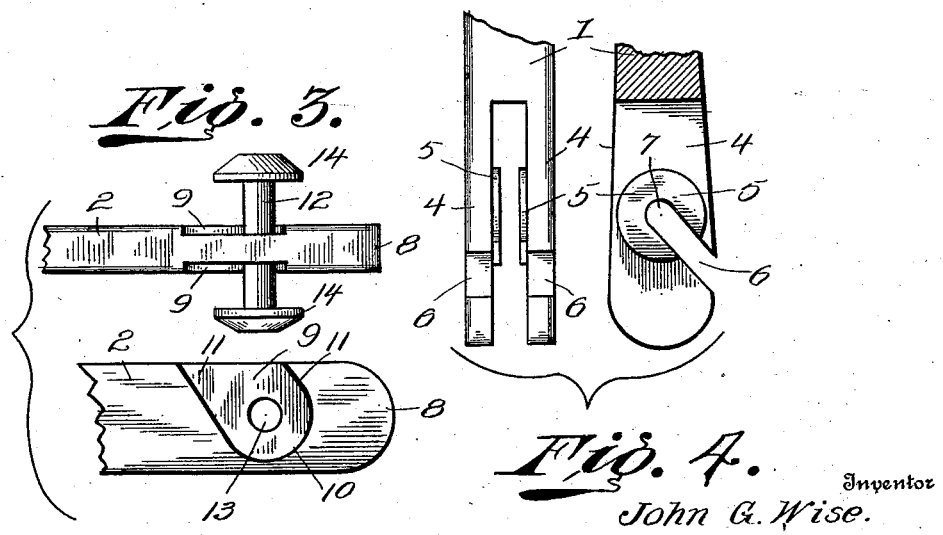
Inventor
John G. Wise.
Witnesses
Jos Gregory.
By Victor J. Evans
Attorney

UNITED STATES PATENT OFFICE.

JOHN G. WISE, OF METROPOLIS, ILLINOIS.

SWITCH-ROD CONNECTION.

No. 915,524.   Specification of Letters Patent.   Patented March 16, 1909.

Application filed November 20, 1908. Serial No. 463,696.

*To all whom it may concern:*

Be it known that I, JOHN G. WISE, a citizen of the United States of America, residing at Metropolis, in the county of Massac and State of Illinois, have invented new and useful Improvements in Switch-Rod Connections, of which the following is a specification.

This invention relates to switch rod connections, and one of the principal objects of the same is to provide a pivotal and detachable connection for two rods so that one of said rods may be moved relatively to the other after connection without fear of disconnecting the two members.

Another object of the invention is to provide simple and efficient means for joining together two rods and for providing means whereby said rods may be disconnected when they are placed in relative position which they will not assume in use.

These and other objects may be attained by means of the construction illustrated in the accompanying drawing, in which,—

Figure 1 is a side elevation of a switch rod connection made in accordance with my invention. Fig. 2 is an end view of the same. Fig. 3 is a detail edge view and side view of one end of one of the members of the connection. Fig. 4 is an edge view and a sectional side view of one end of the other member of the connection.

Referring to the drawing, the numeral 1 designates one member of the connection, and 2 is the other member thereof. The member 1 is provided with a bifurcated head 3 having two spaced lugs 4. The lugs 4 are each provided with an interior boss or enlargement 5 and an inclined open slot 6 which extends from one edge to each of the lugs 4 to the center of the boss 5, the inner end of said slot being rounded, as at 7. The slots 6 in the lug 4 are coincidently disposed. The member 2 of the joint is provided with a rounded end 8, and said member is of a thickness represented by the space between the lugs 4 of the member 1. A recess 9 is formed upon the opposite sides of the member 2, said recess having a rounded inner end 10 designed to fit around the bosses 5 of the member 1, said recesses having parallel inclined sides 11 extending out to one edge of the member 2. A pin 12 firmly secured in a hole 13 in the member 2 is provided with oppositely disposed heads 14, said pin being located in the center of the grooved portion of the recess.

In connecting the members 1 and 2 of the connection it is necessary to bring the inclined walls 11 of the recesses 9 into coincidence with the slots 6 in the lugs 4. When the two members are in this position the pin 12 will ride into the inclined slots 6, and when the two members are turned from this position the curved portions 10 of the recesses 9 will fit around the bosses 5 and prevent the detachment of the two members. Thus the two members may assume any position from that shown in Fig. 1, where the members are angularly disposed, to a position in alinement and to a position in which the member 1 is at right angles upon the opposite sides of the member 2 to that shown in Fig. 1, without detachment of the parts.

My invention is of simple construction, may be used for connecting two members of a switch rod and may be used in many other places wherever it is desired to connect together detachably two members by a pivotal connection.

I claim:—

The herein described switch rod connection comprising two members, one of which is provided with a bifurcated head having bosses extending inwardly from the bifurcations and said bifurcations being provided with oppositely disposed coincidently arranged slots which extend out through the edge of said head, and the other member being provided with oppositely disposed recesses to engage said bosses, and a transverse pin extending through said recesses and provided with heads to engage the sides of the coincidently arranged slots.

In testimony whereof I affix my signature in presence of two witnesses.

JOHN G. WISE.

Witnesses:
 M. SMITH,
 F. A. TROUTHALL.